US010406488B2

(12) United States Patent
Song et al.

(10) Patent No.: US 10,406,488 B2
(45) Date of Patent: Sep. 10, 2019

(54) SPLIT-TYPE BEVERAGE DISPENSER

(71) Applicant: i-Drink Products Inc., Ann Arbor, MI (US)

(72) Inventors: Ning Song, He Shan (CN); Jianqiang Ma, He Shan (CN); Zhaojun Wang, Ann Arbor, MI (US)

(73) Assignee: i-Drink Products Inc., Ann Arbor, MI (US)

(*) Notice: Subject to any disclaimer, the term of this patent is extended or adjusted under 35 U.S.C. 154(b) by 179 days.

(21) Appl. No.: 15/651,493

(22) Filed: Jul. 17, 2017

(65) Prior Publication Data

US 2017/0312706 A1 Nov. 2, 2017

Related U.S. Application Data

(63) Continuation of application No. PCT/CN2015/071592, filed on Jan. 27, 2015.

(30) Foreign Application Priority Data

Jan. 12, 2015 (CN) .................... 2015 2 0017816 U

(51) Int. Cl.
*A23L 2/54* (2006.01)
*B01F 3/04* (2006.01)
*A47J 31/46* (2006.01)

(52) U.S. Cl.
CPC ............ *B01F 3/04794* (2013.01); *A23L 2/54* (2013.01); *A47J 31/46* (2013.01); *A23V 2002/00* (2013.01); *B01F 2003/049* (2013.01)

(58) Field of Classification Search
CPC .......... A47J 31/46; A23L 2/54; B01F 3/04794; B01F 3/04787
(Continued)

(56) References Cited

U.S. PATENT DOCUMENTS 4,082,123 A * 4/1978 Haythornthwaite ........................ B01F 13/0033
141/64
4,395,940 A 8/1983 Child et al.
(Continued)

FOREIGN PATENT DOCUMENTS

CN 203468329 3/2014
CN 203801663 9/2014

*Primary Examiner* — Robert A Hopkins
(74) *Attorney, Agent, or Firm* — Mitchell Law PLLC; Matthew W. Mitchell

(57) ABSTRACT

A drink dispenser with detachable fizz infuser including drink bottle, characterized by and comprising a base, a main body, a main body support, a top cap, an exiting gas driving device, a gas exiting device, a gas transfer device, a gas inlet device, and a $CO_2$ cylinder. The compartment for the $CO_2$ cylinder in the said main body has an inlet and an outlet as well as a side cap that is connected to the main body and pin-jointed with the inlet and the outlet. With this structure, the gas exiting device can be activated simply by pressing the exiting gas driving device. Gas flows from the $CO_2$ cylinder, enters the gas transfer device and the gas inlet device, and ends up in the drink bottle. The operation is simple and easy. The configuration of the safety device eliminates potential safety hazards and ensures safety by preventing the drink bottles from being over-pressurized. Provision of the side cap facilitates convenient replacement of the $CO_2$ cylinder.

14 Claims, 9 Drawing Sheets

(58) Field of Classification Search
USPC .................................. 141/64, 97; 261/76, 77
See application file for complete search history.

(56) References Cited

U.S. PATENT DOCUMENTS

| 5,676,186 A | 10/1997 | Vanderploeg |
| 2013/0089645 A1 | 4/2013 | Leung et al. |

* cited by examiner

SPLIT-TYPE BEVERAGE DISPENSER

CROSS-REFERENCE TO RELATED APPLICATIONS

This application claims priority to PCT Application No. PCT/CN2015/071592, filed Jan. 27, 2015, which claims priority to Chinese Application No. 201520017816, filed Jan. 12, 2015. The content of the above applications are incorporated by reference in their entirety.

TECHNICAL FIELD

The utility model relates to drink manufacturing device, and more particular, to a drink dispenser with detachable fizz infuser.

BACKGROUND

In the prior art, the existing drink is that the wine, syrup, water and other raw materials are placed in a special container according to a certain proportion, the raw materials in the container are mixed fully by a special bartender through actions in the performing form, then are poured into a water glass, and soda water and fruits are added for embellishment.

SUMMARY

The object of the utility model is to provide a drink dispenser with a detachable fizz infuser, which can prepare drink at home, is safe and reliable, and is convenient to operate.

The utility model is realized as follows: a drink dispenser with a detachable fizz infuser, comprising a drink bottle, characterized by and further comprising a base, a main body, a main body support, a top cap, an exiting gas driving device, a gas exiting device, a gas transfer device, a gas inlet device, and a $CO_2$ cylinder, The main body is provided with an upper opening and a lower opening, one side is provided with a notch of the drink bottle, and the other side is provided with a compartment for the $CO_2$ cylinder; the top cap is pin-jointed with the upper opening of the main body, and a lower end of the main body is fixedly connected with the base;

The main body support is arranged at an upper portion in the main body, the gas exiting device is arranged on the main body support, is opposite to the compartment, and is matched with the $CO_2$ cylinder; the exiting gas driving device is arranged on the top cap and is matched with the gas exiting device; the gas transfer device is arranged on the main body support and is opposite to the notch; the gas inlet device is arranged on the main body support, a bottle neck of the drink bottle is detachably connected with the gas inlet device, the gas inlet device is communicated with and detachably matched with the gas transfer device, and the gas transfer device is communicated with the gas exiting device.

For the drink dispenser with detachable fizz infuser, the special part is as follows: the gas exiting device comprises a gas exiting main body, a gas exiting rod, a spring and a driven driving part, the exiting gas driving device is matched with the driven driving part;

The gas exiting main body comprises a gas exiting rod passage, a thimble passage, a lower interface, a gas exiting passage and two supports, the gas exiting rod passage, the thimble passage and the lower interface are on the axis, and the gas exiting passage is communicated with the thimble passage;

The gas exiting rod comprises a sliding rod portion, a stop plate and a thimble portion;

The driven driving part comprises a triggering end, a pivoting end and a connecting portion adjacent to the pivoting end, and the connecting portion is provided with a chamber with a lower opening, The lower interface of the gas exiting main body is inserted into a connecting hole in the main body support and is fixedly connected with the main body support; the sliding rod portion passes through the thimble passage and the gas exiting rod passage and is extended out of the gas exiting rod passage, the sliding rod portion and the gas exiting rod passage are matched in a sliding way and is sealed by liquid-gas, the stop plate is matched with a top plate of the thimble passage to stop, an upper end of the sliding rod portion is extended in the connecting portion; the spring is sheathed on the gas exiting rod passage, the upper end of the spring is extended in the connecting portion of the driven driving part, while the lower end thereof is matched with the support main body; and the pivoting end of the driven driving part is pivoted with the support; and The gas exiting passage is connected and communicated with the gas transfer device.

For the drink dispenser with detachable fizz infuser, the special part is as follows: the gas transfer device comprises a rotary support, a gas inlet positioning column, a gas transfer tube and a fastening nut, The rotary support comprises a base body having a lower opening and a side opening, a guide cavity located at the top of the base body, a guide hole located in the base body, an angular pivoting frame located at the side of the guide cavity and blocking plates located at both sides of the lower portion of the base body, a wall plate of the guide cavity is provided with a guide slot; the guide hole is communicated with the guide cavity, and a center of the guide hole and that of the guide cavity are in a straight line;

The gas inlet positioning column comprises a substrate, an external thread interface located at the top of the substrate, a duct located at a lower portion of the substrate and guide rods located at both sides of the substrate;

The main body support is provided with installing positions having an upper opening, a lower opening and a side opening, both sides of a sealing end of the installing position are provided with pivoting frame cavities, and a side opening end is provided with a pivoting seat;

The substrate of the gas inlet positioning column is arranged in the guide cavity of the rotary support, the duct is matched with the upper guide hole of the base body in a sliding way, the guide rod is matched with the guide slot in a sliding way; one end of the gas transfer tube passes through the gas inlet positioning column to extend out, while the other end thereof passes through the fastening nut to extend out, the fastening nut is screwed with the external thread interface to fix the gas transfer tube; and an end portion of the gas transfer tube is communicated with the gas exiting device;

The top plate in the notch of the main body is provided with an embedding hole, the installing position of the main body support is embedded with the embedding hole, an opening end of the installing position and the embedding hole form a guide stop hole; the guide cavity of the rotary support is matched with the installing position in a rotating way, the base body of the rotary support is fit with a lower surface of the main body support; the pivoting frame is matched with the pivoting frame cavity in a sliding way to stop, and the end portion of the pivoting frame is pivoted with the pivoting seat.

For the drink dispenser with detachable fizz infuser, the special part is as follows: one pivoting frame of the rotary support is provided with a mandril;

The drink dispenser further comprises a pressure spring and a limit rod, one end of the limit rod is provided with a spring seat, while the other end thereof is inclined and guided to a stop surface;

The limit rod is pivoted on the main body support, one end of the pressure spring is inserted with the spring seat, while the other end thereof is abutted against a baffle plate on the main body support; and the end portion of mandril is matched with the inclined guide stop surface in a sliding way.

For the drink dispenser with detachable fizz infuser, the special part is as follows: the gas inlet device comprises an outer cover of the lower opening, a lower cap, a chucking lug block, a gas inlet cap, a safety valve core, a safety spring, a plug screw, An exhaust valve core, an exhaust spring, an exhaust fixing block, an exhaust pull ring, A check valve core, a rubber sleeve, a filter screen, a nozzle bar, a pressure spring, a seal ring and a bottle adapter, A top plate of the outer cover is provided with a center hole and a guide hole, a circular wall is provided with two embedding slots; the outer cover is internally provided with two pivoting seats; and the chucking lug block is embedded with the embedded slots;

The gas inlet cap is provided with a valve core cavity communicated with the gas inlet cap, a top of the valve core cavity is provided with a gas inlet interface; a safety pressure release cavity is communicated with the gas inlet cap, an axis of the safety pressure release cavity is perpendicular to that of the valve core cavity; two exhaust cavities are communicated with the gas inlet cap;

The exhaust fixing block is provided with a compartment having two lower openings, the guide rod hole is communicated with the compartment;

The gas inlet cap is arranged in the outer cover, the center hole of the outer cover is opposite to the gas inlet interface, the guide hole of the outer cover is opposite to the exhaust cavity on the gas inlet cap, the chucking lug block is embedded with the embedding slot, the screw passes through the chucking lug block to screw with the gas inlet cap, the gas inlet cap and the outer cover are fixedly connected together; the safety valve core is arranged in the safety pressure release cavity, one end of the safety spring is matched with the safety valve core, while the other end thereof is matched with the plug screw, and the plug screw is screwed with the safety pressure release cavity;

The exhaust valve core is arranged in the exhaust cavity, the exhaust spring is sheathed on a valve rod of the exhaust valve core, the exhaust cavity is inserted in the compartment of the exhaust fixing block, the exhaust fixing block is fixedly connected with the gas inlet cap, the valve rod passes through the guide rod hole in the exhaust fixing block; a pivoting end of the exhaust pull ring is pivoted with the pivoting seat in the outer cover, the exhaust pull ring is matched with the guide hole in the outer cover in a rotating way; and an upper end of the valve rod is pivoted with the exhaust pull ring;

The filter screen is fit with a top plate of the valve core cavity, the rubber sleeve is sheathed on the check valve core, the check valve core is embedded in a cavity body of the head of the nozzle bar, the head of the nozzle bar is screwed with the valve core cavity; the seal ring is pin-jointed with the gas inlet cap, the bottle adapter is fixedly connected with the gas inlet cap and compresses a circular edge of the seal ring; the rod portion of the nozzle bar passes through the sealing ring, the bottle adapter and the lower cap to extend out; one end of the pressure spring is matched with the gas inlet cap, while the other end thereof is matched with the seal ring, and the drink bottle is detachably matched with bottle adapter.

For the drink dispenser with detachable fizz infuser, the special part is as follows: the compartment for the CO2 cylinder in the said main body has an inlet and an outlet as well as a side cap that is connected to the main body and pin-jointed with the inlet and the outlet.

For the drink dispenser with detachable fizz infuser, with this structure, the gas exiting device can be activated simply by pressing the exiting gas driving device. Gas flows from the CO2 cylinder, enters the gas transfer device and the gas inlet device, and ends up in the drink bottle. The operation is simple and easy. The configuration of the safety device eliminates potential safety hazards and ensures safety by preventing the drink bottles from being over-pressurized. Provision of the side cap facilitates convenient replacement of the CO2 cylinder.

DETAILED DESCRIPTION

The utility model is further described hereinafter with reference to the drawings.

Figure 1:
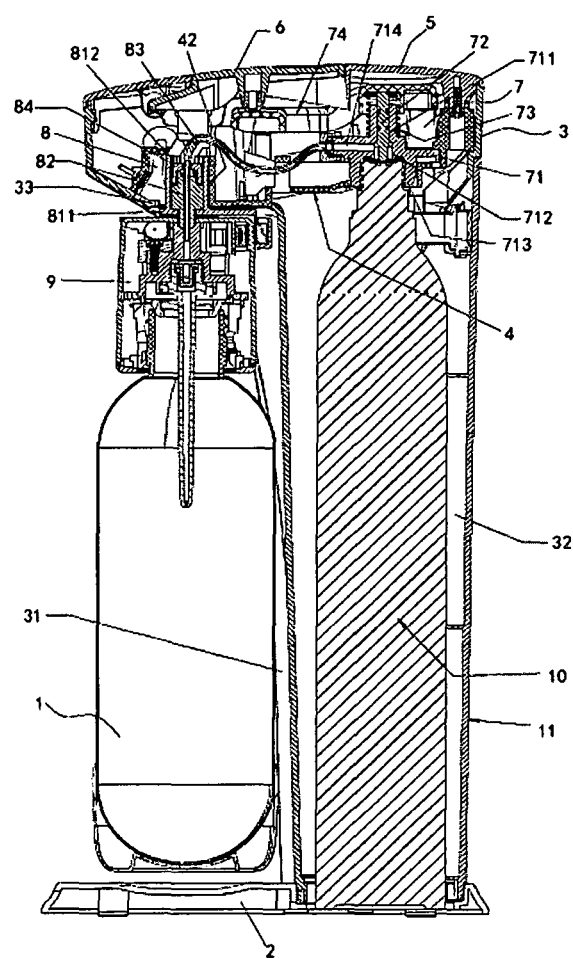
FIG. 1 is a sectional view of the utility model.
Figure 2:
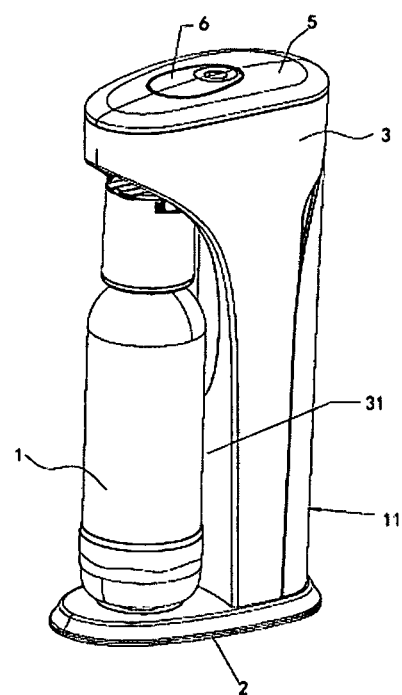
FIG. 2 is a stereogram of the utility model.
Figure 3:
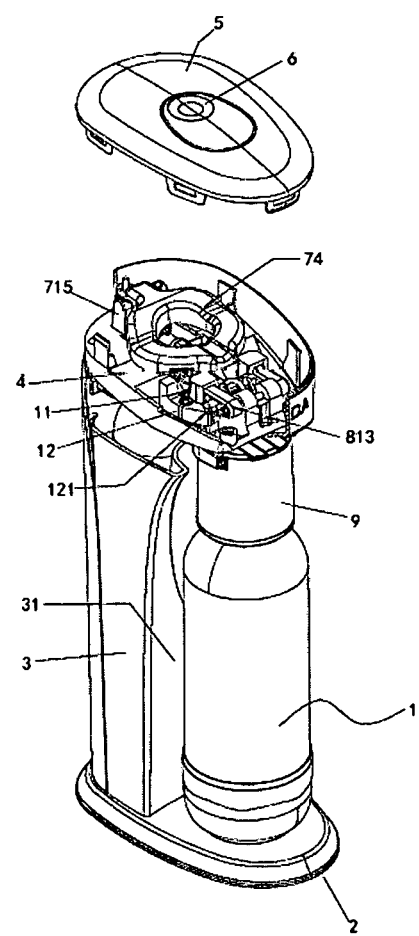
FIG. 3 is one of part sectional views of the utility model.
Figure 4:
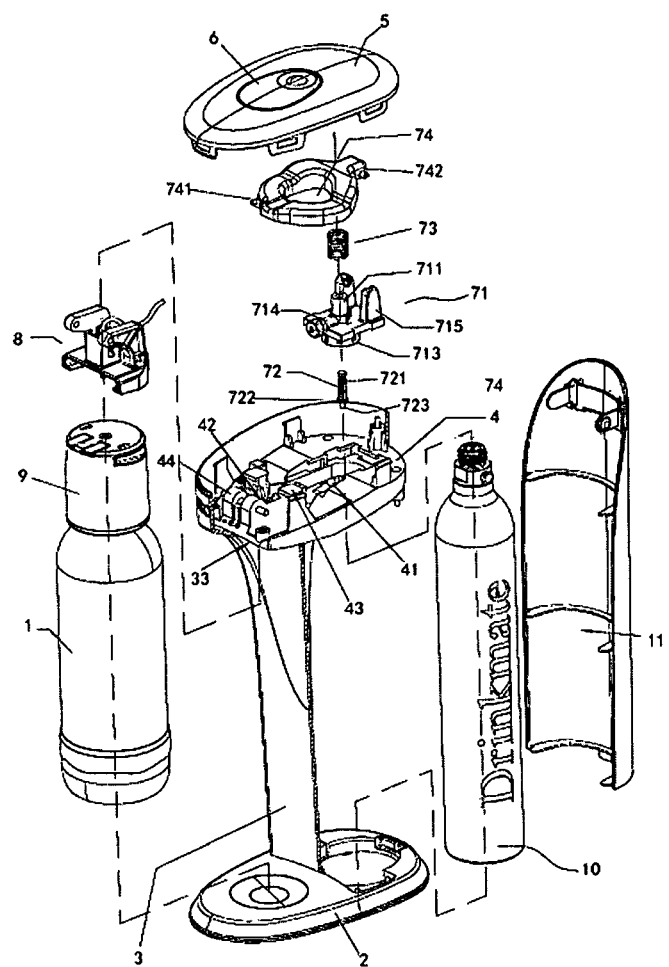
FIG. 4 is one of three-dimensional breakdown drawings of the utility model.
Figure 5:
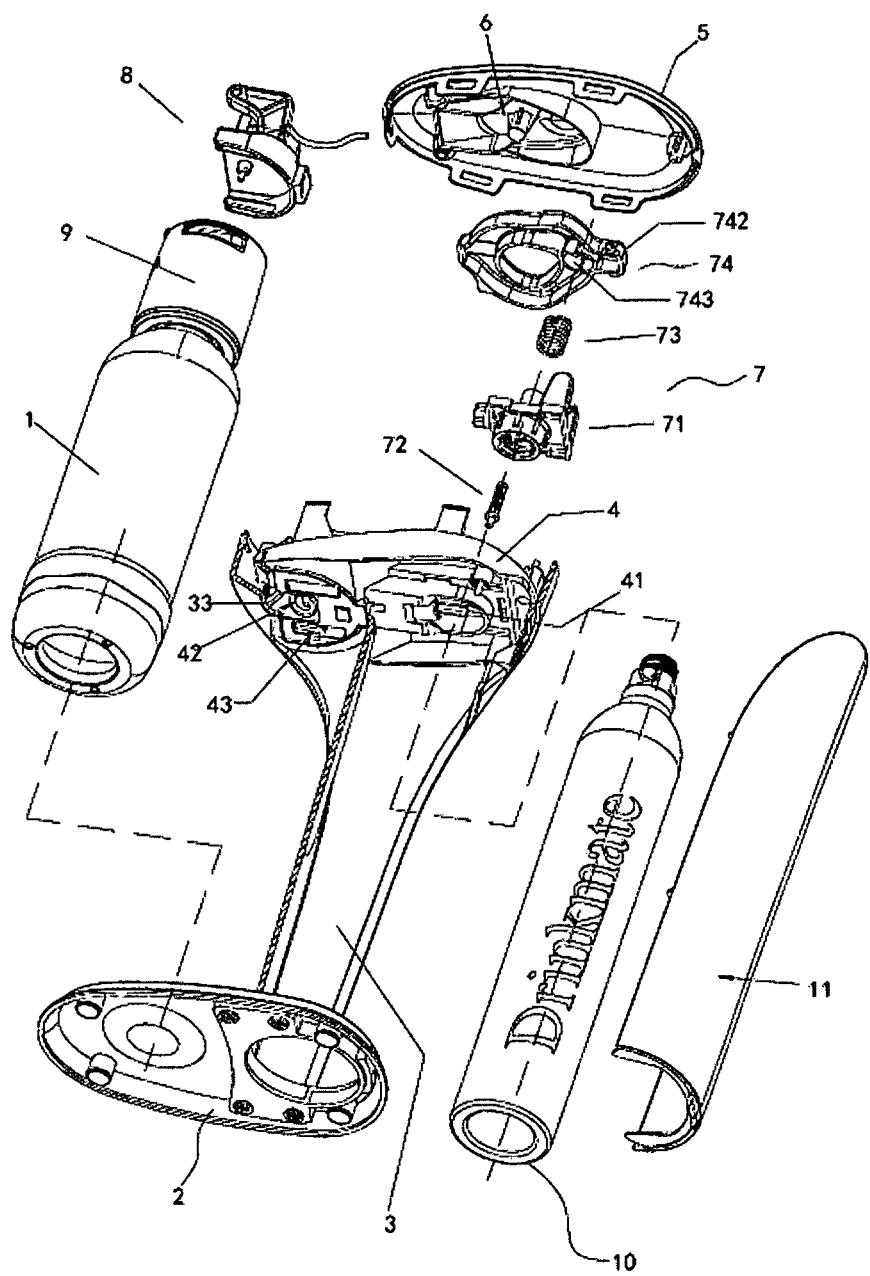
FIG. 5 is the other of three-dimensional breakdown drawings of the utility model.
Figure 6:
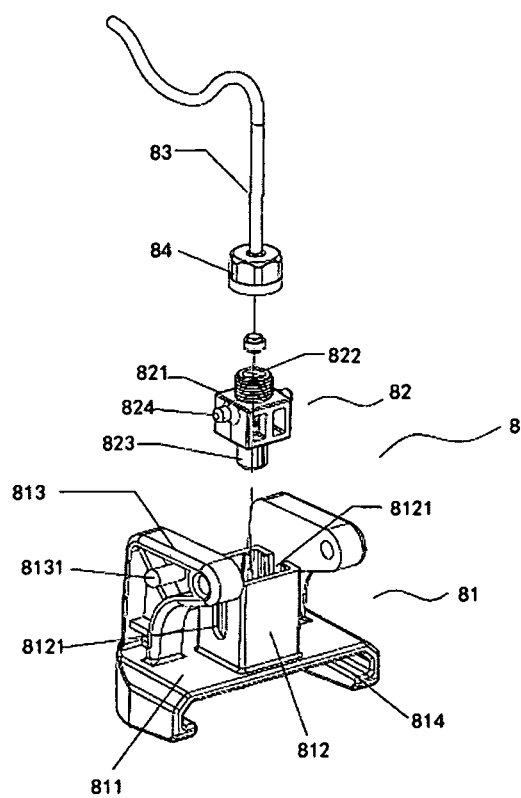
FIG. 6 is a three-dimensional breakdown drawing of the gas transfer device of the utility model.

As shown in FIG. 1, a drink dispenser with detachable fizz infuser comprises a drink bottle 1, further comprises a base 2, a main body 3, a main body support 4, a top cap 5, an exiting gas driving device 6, a gas exiting device 7, a gas transfer device 8, a gas inlet device 9, and a CO2 cylinder 10, The main body 3 is provided with an upper opening and a lower opening, one side is provided with a notch 31 of the drink bottle, and the other side is provided with a compartment 32 for the CO2 cylinder; the top cap 5 is pin-jointed with the upper opening of the main body 3, and a lower end of the main body 3 is fixedly connected with the base 2; a portion of the base 2 located in the compartment 32 is provided with a CO2 cylinder seat, a portion of the base 2 opposite to the notch 31 is provided with a support seat of the drink bottle 1.

The main body support 4 is arranged at an upper portion in the main body 3, the gas exiting device 7 is arranged on the main body support 4, is opposite to the compartment 31, and is matched with the CO2 cylinder 10; the exiting gas driving device 6 is arranged on the top cap 5 and is matched with the gas exiting device 7; the exiting gas driving device 6 is driven by the gas exiting device 7; the gas transfer device 8 is arranged on the main body support 4 and is opposite to the notch 31; the gas inlet device 9 is arranged on the main body support 4, a bottle neck of the drink bottle is detachably connected with the gas inlet device 9, the gas inlet device 9 is communicated with and detachably matched with the gas transfer device 8, and the gas transfer device 8 is communicated with the gas exiting device 7.

The gas exiting device 7 comprises a gas exiting main body 71, a gas exiting rod 72, a spring 73 and a driven driving part 74, and the exiting gas driving device 6 is matched with the driven driving part 74.

The gas exiting main body 71 comprises a gas exiting rod passage 711, a thimble passage 712, a lower interface 713, a gas exiting passage 714 and two supports 715, the gas exiting rod passage 711, the thimble passage 712 and the lower interface 713 are on the axis, and the gas exiting passage 714 is communicated with the thimble passage 712.

The gas exiting rod 72 comprises a sliding rod portion 721, a stop plate 722 and a thimble portion 723.

The driven driving part 74 comprises a triggering end 741, a pivoting end 742 and a connecting portion 743 adjacent to the pivoting end, and the connecting portion 742 is provided with a chamber with a lower opening.

The lower interface 713 of the gas exiting main body 71 is inserted into a connecting hole 41 in the main body support 4 and is fixedly connected with the main body support 4; the sliding rod portion 721 passes through the thimble passage 712 and the gas exiting rod passage 711 and is extended out of the gas exiting rod passage 711, the sliding rod portion 721 and the gas exiting rod passage 711 are matched in a sliding way and is sealed by liquid-gas, the stop plate 722 is matched with a top plate of the thimble passage 712 to stop, an upper end of the sliding rod portion 721 is extended in the connecting portion 743; the spring 73 is sheathed on the gas exiting rod passage 711, the upper end of the spring is extended in the connecting portion 743 of the driven driving part 74, while the lower end thereof is matched with the support main body 71; and the pivoting end 742 of the driven driving part 74 is pivoted with the support 715.

The gas exiting passage 714 is connected and communicated with the gas transfer device 8. The exiting gas driving device 6 is pressed down to rotate the driven driving part 74, the driven driving part 74 allows the gas exiting rod to move downward, and a gas outlet valve of the CO2 cylinder 10 is opened; when the exiting gas driving device 6 loses pressure, the exiting gas driving device 6 and the driven driving part 74 automatically reset due to the function of the spring 73, and the gas exiting rod 72 is reset under the function of the gas pressure of the CO2 cylinder 10.

The gas transfer device 8 comprises a rotary support 81, a gas inlet positioning column 82, a gas transfer tube 83 and a fastening nut 84, The rotary support 81 comprises a base body 811 having a lower opening and a side opening, a guide cavity 812 located at the top of the base body, a guide hole located in the base body, an angular pivoting frame 813 located at the side of the guide cavity and blocking plates 814 located at both sides of the lower portion of the base body, a wall plate of the guide cavity 812 is provided with a guide slot 8121; the guide hole is communicated with the guide cavity 812, and a center of the guide hole and that of the guide cavity are in a straight line.

The gas inlet positioning column 82 comprises a substrate 821, an external thread interface 822 located at the top of the substrate, a duct 823 located at a lower portion of the substrate and guide rods 824 located at both sides of the substrate; an outer surface of the duct 823 is provided with a guide slot, the guide hole in the base body is provided with a guide rail, the guide rail is matched with the guide slot, so as to prevent the gas inlet positioning column 82 to rotate.

The main body support 4 is provided with installing positions 42 having an upper opening, a lower opening and a side opening, both sides of a sealing end of the installing position are provided with pivoting frame cavities 43, and a side opening end is provided with a pivoting seat 44.

The substrate 821 of the gas inlet positioning column 82 is arranged in the guide cavity 812 of the rotary support 81, the guide rod 824 is matched with the guide slot 8121 in a sliding way, the duct 823 is matched with the upper guide hole of the base body 811 in a sliding way; one end of the gas transfer tube 83 passes through the gas inlet positioning column 82 to extend out, while the other end thereof passes through the fastening nut 84 to extend out, the fastening nut 84 is screwed with the external thread interface 822 to fix the gas transfer tube 83; and an end portion of the gas transfer tube 83 is communicated with the gas exiting device; namely, the gas transfer tube 83 is communicated with the gas exiting passage 714.

The top plate in the notch 31 of the main body 3 is provided with an embedding hole 33, the installing position 42 of the main body support 4 is embedded with the embedding hole 33, an opening end of the installing position 42 and the embedding hole 33 form a guide stop hole; the guide cavity 812 of the rotary support 81 is matched with the installing position 42 in a rotating way, the base body 811 of the rotary support 81 is fit with a lower surface of the main body support 4; the pivoting frame 813 is matched with the pivoting frame cavity 43 in a sliding way to stop, and the end portion of the pivoting frame 813 is pivoted with the pivoting seat 44.

As the improvement: one pivoting frame 813 of the rotary support 81 is provided with a mandril 8131.

The drink dispenser further comprises a pressure spring 11 and a limit rod 12, one end of the limit rod 12 is provided with a spring seat, while the other end thereof is provided with an inclined guide stop surface 121.

The limit rod 12 is pivoted on the main body support 4, one end of the pressure spring 11 is inserted with the spring seat, while the other end thereof is abutted against a baffle plate on the main body support 4; and the end portion of mandril 8131 is matched with the inclined guide stop surface 121 in a sliding way. As shown in FIG. 1, the guide cavity 812 of the rotary support 81 is located in the guide stop hole formed by the opening end of the installing position 42 and the embedding hole 33, the rotary support 81 can rotate a certain angle clockwise, and is matched with the embedding hole portion of the guide stop hole to stop during rotation; and when the rotary support 81 rotates, the mandril 8131 is matched with the inclined guide stop surface 121 in a sliding way to limit.

Figure 7:
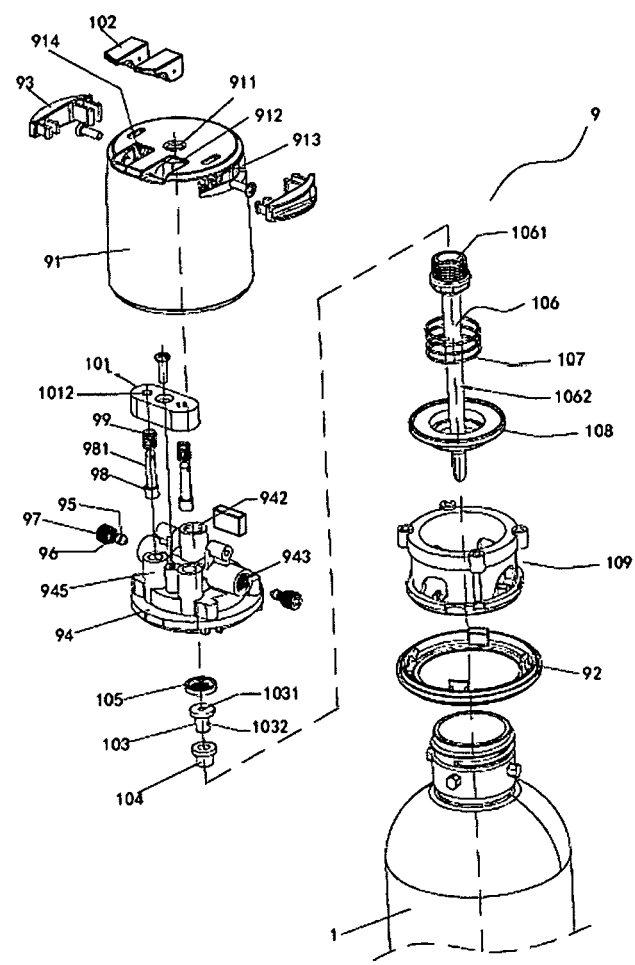
FIG. 7 is a three-dimensional breakdown drawing of the gas inlet device of the utility model.
Figure 8:
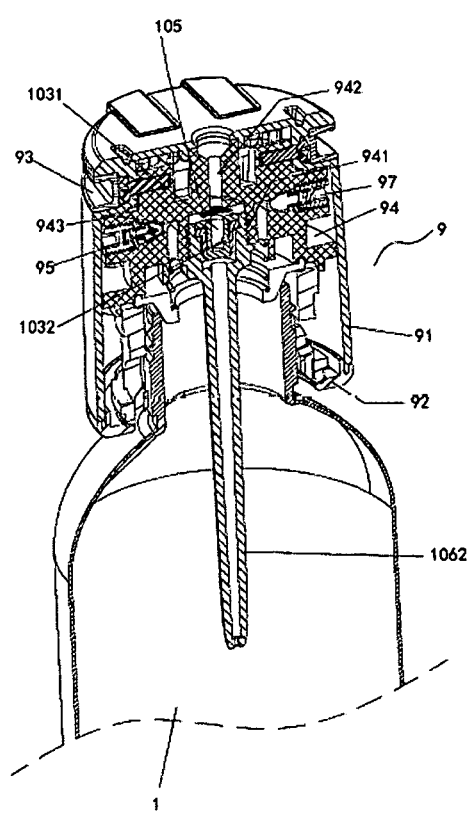
FIG. 8 is one of sectional views of the gas inlet device of the utility model.
Figure 9:
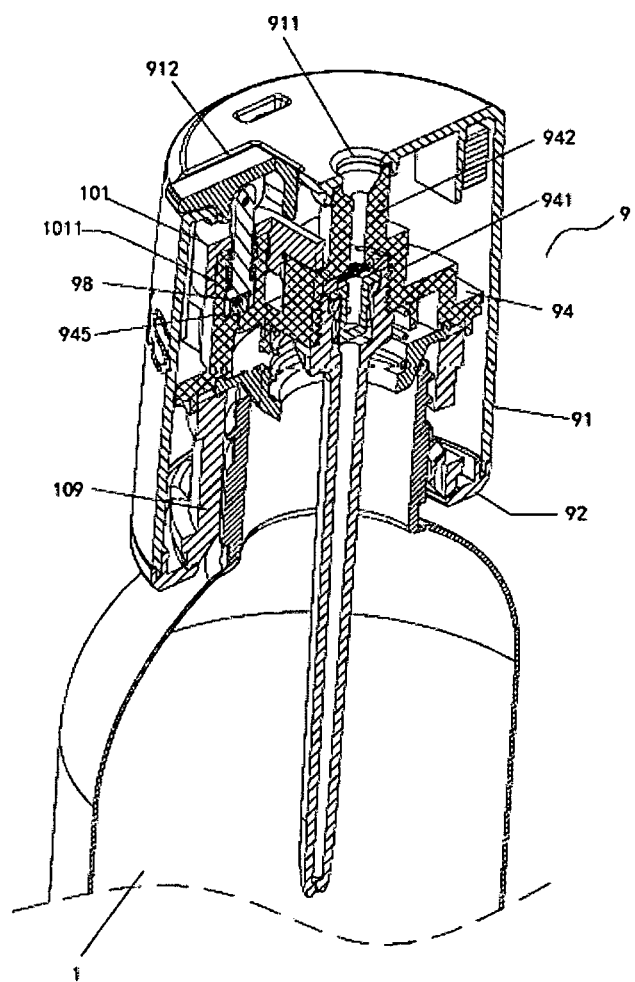
FIG. 9 is the other of sectional views of the gas inlet device of the utility model.

As shown in FIG. 7, FIG. 8 and FIG. 9, the gas inlet device 9 comprises an outer cover 91 of the lower opening, a lower cap 92, a chucking lug block 93, a gas inlet cap 94, a safety valve core 95, a safety spring 96, a plug screw 97, An exhaust valve core 98, an exhaust spring 99, an exhaust fixing block 101, an exhaust pull ring 102, A check valve core 103, a rubber sleeve 104, a filter screen 105, a nozzle bar 106, a pressure spring 107, a seal ring 108 and a bottle adapter 109.

A top plate of the outer cover 91 is provided with a center hole 911 and a guide hole 912, a circular wall is provided with two embedding slots 913; the outer cover is internally provided with two pivoting seats 914; and the chucking lug block 93 is embedded with the embedded slots 913.

The gas inlet cap 94 is provided with a valve core cavity 941 communicated with the gas inlet cap 94, a top of the valve core cavity 941 is provided with a gas inlet interface 942; a safety pressure release cavity 943 is communicated with the gas inlet cap 94, an axis of the safety pressure release cavity 943 is perpendicular to that of the valve core cavity 941; two exhaust cavities 945 are communicated with the gas inlet cap 94.

The exhaust fixing block 101 is provided with a compartment 1011 having two lower openings, and the guide rod hole 1012 is communicated with the compartment 1011.

The gas inlet cap 94 is arranged in the outer cover 91, the center hole 911 of the outer cover 91 is opposite to the gas inlet interface 942, the guide hole 912 of the outer cover 91 is opposite to the exhaust cavity 945 on the gas inlet cap 94, the chucking lug block 93 is embedded with the embedding slot 913, the screw passes through the chucking lug block 93 to screw with the gas inlet cap 94, the gas inlet cap 94 and the outer cover 91 are fixedly connected together; the safety valve core 95 is arranged in the safety pressure release cavity 943, one end of the safety spring 96 is matched with the safety valve core 95, while the other end thereof is matched with the plug screw 97, and the plug screw 97 is screwed with the safety pressure release cavity 943.

The exhaust valve core 98 is arranged in the exhaust cavity 945, the exhaust spring 99 is sheathed on a valve rod 981 of the exhaust valve core 98, the exhaust cavity 945 is inserted in the compartment 1011 of the exhaust fixing block 101, the exhaust fixing block 101 is fixedly connected with the gas inlet cap 94, the valve rod 981 passes through the guide rod hole 1012 in the exhaust fixing block 101; a pivoting end of the exhaust pull ring 102 is pivoted with the pivoting seat 914 in the outer cover 91, the exhaust pull ring 102 is matched with the guide hole 912 in the outer cover 91 in a rotating way; an upper end of the valve rod 981 is pivoted with the exhaust pull ring 102; the exhaust pull ring 102 is lifted upward, the exhaust valve core 98 moves upward, so as to achieve the purpose of discharging; the exhaust pull ring loses the power, and the exhaust valve core 98 is reset.

The filter screen 105 is fit with a top plate of the valve core cavity 941, the rubber sleeve 104 is sheathed on the check valve core 103, the check valve core 103 is embedded in a cavity body 1061 of the head of the nozzle bar 106, the head of the nozzle bar 106 is screwed with the valve core cavity 941; the seal ring 108 is pin-jointed with the gas inlet cap 94, the bottle adapter 109 is fixedly connected with the gas inlet cap 94 and compresses a circular edge of the seal ring 108; the rod portion 1062 of the nozzle bar 106 passes through the sealing ring 108, the bottle adapter 109 and the lower cap 92 to extend out; one end of the pressure spring 107 is matched with the gas inlet cap 94, while the other end thereof is matched with an inner ring table of the seal ring 108, and the drink bottle 1 is detachably matched with bottle adapter 109.

The check valve core 103 is provided with a cavity body 1031 having an upper opening, a radial gas exiting hole 1032 communicated with the cavity body and a flange, the rubber sleeve 104 is provided with a flange and a through hole, the cavity body 1061 of the head of the nozzle bar 106 is provided with a counter bored hole, and the flange is arranged on a bottom plate of the counter bored hole. A clearance exists between a bottom of the check valve core 103 and the bottom plate of the cavity body.

The compartment 32 for the CO2 cylinder in the said main body 3 has an inlet and an outlet as well as a side cap 11 that is connected to the main body 3 and pin-jointed with the inlet and the outlet.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A drink dispenser with a detachable fizz infuser, comprising:
    a drink bottle having a bottle neck;
    a base;
    a main body, having an upper opening and a lower opening, one side is provided with a notch of the drink bottle, and an opposing side is provided with a compartment for a carbon dioxide cylinder;
    a main body support, arranged at the upper portion in the main body;
    a top cap, pin-jointed with the upper opening of the main body, and wherein the lower end of the main body is fixedly connected with the base;
    an exiting gas driving device, is arranged on the top cap and is matched with a gas exiting device, wherein the gas exiting device is arranged on the main body support, opposite to a compartment, and wherein the gas exiting device further comprises a gas exiting main body, a gas exiting rod, a spring and a driven driving part, and wherein the gas exiting driving device is matched with the driven driving part, and wherein the gas exiting main body comprises a gas exiting rod passage, a thimble passage, a lower interface, a gas exiting passage and two supports, the gas exiting rod passage, the thimble passage and the lower interface are on the axis, and the gas exiting passage is communicated with the thimble passage;
    a gas transfer device arranged on the main body support and is opposite to the notch;
    a gas inlet device arranged on the main body support, wherein the bottle neck of the drink bottle is detachably connected with the gas inlet device, wherein the gas inlet device is communicated with and detachably matched with the gas transfer device, and wherein the gas transfer device is communicated with the gas exiting device; and
    a carbon dioxide cylinder, matched with the gas exiting device.

2. The drink dispenser of claim 1, wherein the gas exiting rod comprises a sliding rod portion, a stop plate and a thimble portion, wherein the driven driving part comprises a triggering end, a pivoting end and a connecting portion adjacent to the pivoting end, and the connecting portion is provided with a chamber with a lower opening.

3. The drink dispenser of claim 2, wherein the lower interface of the gas exiting main body is inserted into a connecting hole in the main body support and is fixedly connected with the main body support; the sliding rod portion passes through the thimble passage and the gas exiting rod passage and is extended out of the gas exiting rod passage, the sliding rod portion and the gas exiting rod passage are matched in a sliding way and is sealed by liquid-gas, the stop plate is matched with a top plate of the thimble passage to stop, an upper end of the sliding rod portion is extended in the connecting portion; the spring is sheathed on the gas exiting rod passage, the upper end of the spring is extended in the connecting portion of the driven driving part, while the lower end thereof is matched with the support main body; and the pivoting end of the driven driving part is pivoted with the support; and wherein the gas exiting passage is connected and communicated with the gas transfer device.

4. The drink dispenser of claim 1, wherein the compartment for the $CO_2$ cylinder in the said main body has an inlet and an outlet as well as a side cap that is connected to the main body and pin-jointed with the inlet and the outlet.

5. A drink dispenser with a detachable fizz infuser, comprising:
   a drink bottle having a bottle neck;
   a base;
   a main body, having an upper opening and a lower opening, one side is provided with a notch of the drink bottle, and an opposing side is provided with a compartment for a carbon dioxide cylinder;
   a main body support, arranged at the upper portion in the main body;
   a top cap, pin-jointed with the upper opening of the main body, and wherein the lower end of the main body is fixedly connected with the base;
   an exiting gas driving device, is arranged on the top cap and is matched with a gas exiting device, wherein the gas exiting device is arranged on the main body support, opposite to a compartment, and wherein the gas exiting device further comprises a gas exiting main body, a gas exiting rod, a spring and a driven driving part, and wherein the gas exiting driving device is matched with the driven driving part, and wherein the gas exiting main body comprises a gas exiting rod passage, a thimble passage, a lower interface, a gas exiting passage and two supports, the gas exiting rod passage, the thimble passage and the lower interface are on the axis, and the gas exiting passage is communicated with the thimble passage;
   a gas transfer device arranged on the main body support and is opposite to the notch;
   a gas inlet device arranged on the main body support, wherein the bottle neck of the drink bottle is detachably connected with the gas inlet device, wherein the gas inlet device is communicated with and detachably matched with the gas transfer device, and wherein the gas transfer device is communicated with the gas exiting device;
   a carbon dioxide cylinder, matched with the gas exiting device; and
   wherein the gas transfer device further comprises a rotary support, a gas inlet positioning column, a gas transfer tube and a fastening nut.

6. The drink dispenser of claim 5, wherein the rotary support comprises a base body having a lower opening and a side opening, a guide cavity located at the top of the base body, a guide hole located in the base body, an angular pivoting frame located at the side of the guide cavity and blocking plates located at both sides of the lower portion of the base body, a wall plate of the guide cavity is provided with a guide slot; the guide hole is communicated with the guide cavity, and a center of the guide hole and that of the guide cavity are in a straight line.

7. The drink dispenser of claim 6, wherein the gas inlet positioning column comprises a substrate, an external thread interface located at the top of the substrate, a duct located at a lower portion of the substrate and guide rods located at both sides of the substrate.

8. The drink dispenser of claim 7, wherein the main body support is provided with installing positions having an upper opening, a lower opening and a side opening, both sides of a sealing end of the installing position are provided with pivoting frame cavities, and a side opening end is provided with a pivoting seat.

9. The drink dispenser of claim 8, wherein the substrate of the gas inlet positioning column is arranged in the guide cavity of the rotary support, the duct is matched with the upper guide hole of the base body in a sliding way, the guide rod is matched with the guide slot in a sliding way; one end of the gas transfer tube passes through the gas inlet positioning column to extend out, while the other end thereof passes through the fastening nut to extend out, the fastening nut is screwed with the external thread interface to fix the gas transfer tube; and an end portion of the gas transfer tube is communicated with the gas exiting device.

10. The drink dispenser of claim 9, wherein the top plate in the notch of the main body is provided with an embedding hole, the installing position of the main body support is embedded with the embedding hole, an opening end of the installing position and the embedding hole form a guide stop hole; the guide cavity of the rotary support is matched with the installing position in a rotating way, the base body of the rotary support is fit with a lower surface of the main body support; the pivoting frame is matched with the pivoting frame cavity in a sliding way to stop, and the end portion of the pivoting frame is pivoted with the pivoting seat.

11. The drink dispenser of claim 6, wherein one pivoting frame of the rotary support is provided with a mandril.

12. The drink dispenser of claim 11, further comprising a pressure spring and a limit rod, one end of the limit rod is provided with a spring seat, while the other end thereof is provided with an inclined guide stop surface, wherein the limit rod is pivoted on the main body support, one end of the pressure spring is inserted with the spring seat, while the other end thereof is abutted against a baffle plate on the main body support; and the end portion of mandril is matched with the inclined guide stop surface in a sliding way.

13. A drink dispenser with a detachable fizz infuser, comprising:
   a drink bottle having a bottle neck;
   a base;
   a main body, having an upper opening and a lower opening, one side is provided with a notch of the drink bottle, and an opposing side is provided with a compartment for a carbon dioxide cylinder;
   a main body support, arranged at the upper portion in the main body;
   a top cap, pin-jointed with the upper opening of the main body, and wherein the lower end of the main body is fixedly connected with the base;
   an exiting gas driving device, is arranged on the top cap and is matched with a gas exiting device, wherein the gas exiting device is arranged on the main body support, opposite to a compartment, and wherein the gas exiting device further comprises a gas exiting main body, a gas exiting rod, a spring and a driven driving part, and wherein the gas exiting driving device is matched with the driven driving part, and wherein the gas exiting main body comprises a gas exiting rod passage, a thimble passage, a lower interface, a gas exiting passage and two supports, the gas exiting rod passage, the thimble passage and the lower interface are on the axis, and the gas exiting passage is communicated with the thimble passage;

a gas transfer device arranged on the main body support and is opposite to the notch;

a gas inlet device arranged on the main body support, wherein the bottle neck of the drink bottle is detachably connected with the gas inlet device, wherein the gas inlet device is communicated with and detachably matched with the gas transfer device, and wherein the gas transfer device is communicated with the gas exiting device;

a carbon dioxide cylinder, matched with the gas exiting device; and wherein the gas inlet device comprises an outer cover of the lower opening, a lower cap, a chucking lug block, a gas inlet cap, a safety valve core, a safety spring, a plug screw, an exhaust valve core, an exhaust spring, an exhaust fixing block, an exhaust pull ring, a check valve core, a rubber sleeve, a filter screen, a nozzle bar, a pressure spring, a seal ring and a bottle adapter.

14. The drink dispenser of claim 13, wherein the outer cover comprises a top plate and is provided with a center hole and a guide hole, a circular wall is provided with two embedding slots; the outer cover is internally provided with two pivoting seats; and the chucking lug block is embedded with the embedded slots;

wherein the gas inlet cap is provided with a valve core cavity communicated with the gas inlet cap, a top of the valve core cavity is provided with a gas inlet interface; a safety pressure release cavity is communicated with the gas inlet cap, an axis of the safety pressure release cavity is perpendicular to that of the valve core cavity; two exhaust cavities are communicated with the gas inlet cap;

wherein the exhaust fixing block is provided with a compartment having two lower openings, the guide rod hole is communicated with the compartment;

wherein the gas inlet cap is arranged in the outer cover, the center hole of the outer cover is opposite to the gas inlet interface, the guide hole of the outer cover is opposite to the exhaust cavity on the gas inlet cap, the chucking lug block is embedded with the embedding slot, the screw passes through the chucking lug block to screw with the gas inlet cap, the gas inlet cap and the outer cover are fixedly connected together; the safety valve core is arranged in the safety pressure release cavity, one end of the safety spring is matched with the safety valve core, while the other end thereof is matched with the plug screw, and the plug screw is screwed with the safety pressure release cavity;

wherein the exhaust valve core is arranged in the exhaust cavity, the exhaust spring is sheathed on a valve rod of the exhaust valve core, the exhaust cavity is inserted in the compartment of the exhaust fixing block, the exhaust fixing block is fixedly connected with the gas inlet cap, the valve rod passes through the guide rod hole in the exhaust fixing block; a pivoting end of the exhaust pull ring is pivoted with the pivoting seat in the outer cover, the exhaust pull ring is matched with the guide hole in the outer cover in a rotating way; and an upper end of the valve rod is pivoted with the exhaust pull ring; and wherein the filter screen is fit with a top plate of the valve core cavity, the rubber sleeve is sheathed on the check valve core, the check valve core is embedded in a cavity body of the head of the nozzle bar, the head of the nozzle bar is screwed with the valve core cavity; the seal ring is pin-jointed with the gas inlet cap, the bottle adapter is fixedly connected with the gas inlet cap and compresses a circular edge of the seal ring; the rod portion of the nozzle bar passes through the sealing ring, the bottle adapter and the lower cap to extend out; one end of the pressure spring is matched with the gas inlet cap, while the other end thereof is matched with the seal ring, and the drink bottle is detachably matched with bottle adapter.

* * * * *